United States Patent [19]
Potter et al.

[11] Patent Number: 5,131,970
[45] Date of Patent: Jul. 21, 1992

[54] BLOCK-BONDED PROCESS FOR PRODUCING THERMOPLASTIC RESIN IMPREGNATED FIBER HONEYCOMB CORE

[75] Inventors: John E. Potter, Camarillo; John A. Van Hamersveld; Norma J. Cretal, both of Thousand Oaks, all of Calif.

[73] Assignee: Northrop Corporation, Los Angeles, Calif.

[21] Appl. No.: 488,582

[22] Filed: Mar. 2, 1990

[51] Int. Cl.$^5$ .................................. B32B 3/12
[52] U.S. Cl. .................... 156/205; 156/264; 428/118
[58] Field of Search .......... 428/116, 118; 156/205, 156/207, 264

[56] References Cited

U.S. PATENT DOCUMENTS

| | | | |
|---|---|---|---|
| 2,821,616 | 1/1958 | Spott | 428/116 X |
| 2,919,472 | 1/1960 | Steele | 156/197 X |
| 3,673,058 | 6/1972 | Jackson et al. | 428/118 |
| 4,179,540 | 12/1979 | Smarook | 521/98 X |
| 4,457,963 | 7/1984 | Ittner et al. | 428/34.1 |
| 5,021,283 | 6/1991 | Takenaka et al. | 428/118 X |

FOREIGN PATENT DOCUMENTS

WO87/06186 10/1987 PCT Int'l Appl. .............. 428/116

*Primary Examiner*—Henry F. Epstein
*Attorney, Agent, or Firm*—Terry J. Anderson; Robert B. Block

[57] ABSTRACT

Ultra strong lightweight core material capable of sustained operation at unusually high temperatures for composite structure of the type used in aircraft parts such as wings, fairings and stabilizers is produced from preimpregnated thermoplastic fibercloth ribbon by the manufacturing processes of this invention. The fibercloth ribbon is preformed between corrugated rollers of a special roll forming press which heats the ribbon to a softening temperature, forms it into a pattern of half-hex corrugations, cools it and sets it in that pattern. Then sheets cut from the corrugated ribbon are stacked into a bonding press along with hex forming mandrels placed between the sheets in the corrugations. With a full stack, the press is enclosed with side covers containing heating units, hydraulic pressure is applied to compress and consolidate the stack and contact interfacial facets, and heat is applied by directing superheated air jets on the mandrel ends until a bonding temperature is reached, forming the material accurately around the hex mandrels and fusion bonding adjacent sheets together at interfacial facets in a honeycomb pattern. After cooling to a setting temperature, pressure is removed and the bonded stack is removed from the bonding press. The mandrels are then extracted in a special long stroke thin pin pneumatic press, yielding a finished block of lightweight core material having a honeycomb pattern of hex ducts with rigid walls.

3 Claims, 2 Drawing Sheets

BLOCK-BONDED PROCESS FOR PRODUCING THERMOPLASTIC RESIN IMPREGNATED FIBER HONEYCOMB CORE

FIELD OF THE INVENTION

This invention relates to the production of ultra strong lightweight core material for composite structures as used in aircraft, and more particularly to processing preimpregnated thermoplastic fiber cloth material to yield a block of ducted honeycomb core material capable of sustained high temperature operation.

BACKGROUND OF THE INVENTION

Composite structures in aircraft typically utilize a tough skin surface supported by a lightweight core material. Development efforts to increase the strength/weight ratio of the core have resulted in cellular plastic structures such as rigid expanded foam of random cell pattern. Superior structural properties have been realized in cores formed in a geometric honeycomb pattern of hexagonal ducts, which achieve very light weight due to the high percentage of air volume in the range of about 90% to 98%. Such a core, when sandwiched between two skins, forms a directional structure possessing a uniform crushing strength under compression.

In known art, cellular or ducted cores are commonly made from thermosetting resins. As utilization of such structures is expanded to include areas previously avoided due to structural demands and temperature, vibration and impact loading environments, new composite matrices are required. Thermosetting resins, commonly used, in most cases, lack the toughness and stability needed for these applications.

New thermoplastic materials offer improved properties and excellent impact strength and damage tolerance are realized in composite skin-surfaced structures having honeycomb cores made from fiber cloth preimpregnated with thermoplastic resin. However, by their nature, the new thermoplastic materials require new and unconventional processing methods as opposed to conventional thermosetting processes where viscous fluids are saturated into reinforcing fiber forms to be cured by catalysis and heat, thermoplastics, which have no cure cycle, are hard and "boardy" initially, and have to be melted at high temperatures to be worked to the desired shapes. Thus completely different processing schemes are required for thermoplastics than those that have been developed for thermosets.

In known art, thermoset honeycomb material is made by a process that takes advantage of the flexibility of the reinforcing fabric before it is impregnated with resin. It is bonded and then expanded into hexagon honeycomb structure while it is soft, then wash coated with resin which is subsequently cured to give it its stiffness.

In contrast, most thermoplastics are too viscous to be wash coated or by some other means saturated into the fabric after bonding sheets or ribbons together. The practical options for bonding thermoplastic core material together are further limited by the difficulty of making good adhesive bonds with thermoplastics. For these reasons, thermal forming and assembly of preimpregnated thermoplastic material by thermal fusion ducted honeycomb structural pattern has been selected as the method for producing strong lightweight core structure in the present invention, which addresses new processing methods for realizing the full benefits of the superior ultimate properties of such structure.

OBJECTS AND SUMMARY OF THE INVENTION

A primary object of this invention is to provide a method of producing thermoplastic honeycomb core that can be used at sustained high service temperatures without substantial loss of strength or degradation of mechanical properties.

A further object is to provide a method and apparatus for forming corrugations of half hex pattern in a preimpregnated thermoplastic fiber ribbon.

A further object is to provide a method and apparatus for thermal fusion bonding the interfacial facets of a stack of preformed sheets cut from corrugated thermoplastic fiber ribbon, so as to produce a block of hex ducted honeycomb patterned core material.

A still further object is to provide a process and pressing apparatus for removing hexagon aluminum mandrels from a stack of corrugated thermoplastic fibercloth sheets bonded in accordance with this invention, as a final step in producing a block of honeycomb core material.

These objects have been met in the processes and apparatus of this invention which will be described in connection with the accompanying drawings.

BRIEF DESCRIPTION OF THE DRAWINGS

FIGS. 3A-3F comprise a schematic diagram of the overall process of manufacturing a block of honeycomb core from thermoplastic fiber ribbon in accordance with the present invention, in which:

FIG. 3A shows the corrugating step;

FIG. 3B shows the cutting step to form strips;

FIG. 3C shows the stacking and mandrel insertion steps;

FIG. 3D shows the layer fusing step;

FIG. 3E shows the mandrel extraction step; and

FIG. 3F shows a forming step being taken on the completed honeycomb product.

DETAILED DESCRIPTION

Figure 1:
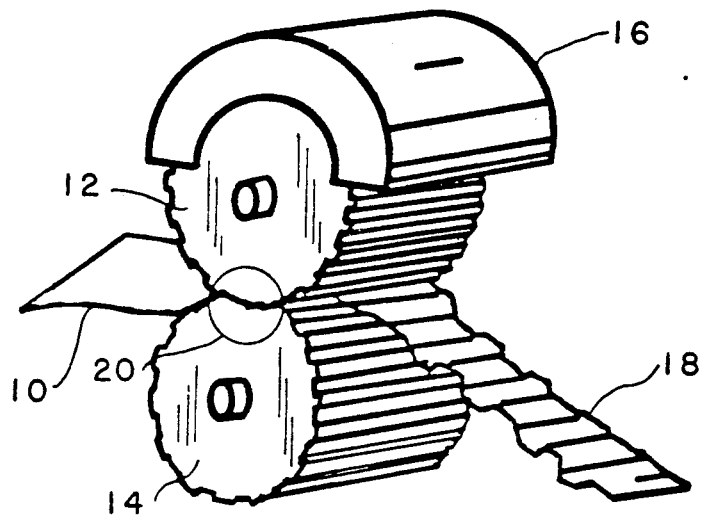
FIG. 1 is a schematic representation of a heated roller press in the process of corrugating a thermoplastic fiber ribbon in accordance with present invention.

Returning now to the drawings in detail, FIG. 1 depicts a roll forming process of this invention in which presaturated thermoplastic fibercloth ribbon 10 is being corrugated between rollers 12 and 14 which are spring loaded against each other in a well known manner. A controllable heating unit 16 is disposed in a wrapped-around configuration close to the upper portion of upper roller 12 so as to heat it while the lower roller 14, having no heat applied, remains relatively cool. With this arrangement, as the ribbon 10 is passed between the rollers 12 and 14, the top roller 12 heats the material to a formable temperature and then, as the formed material 18 exits at a downward angle, the lower roller 14 cools it almost immediately to set it in its new shape.

Figure 2:
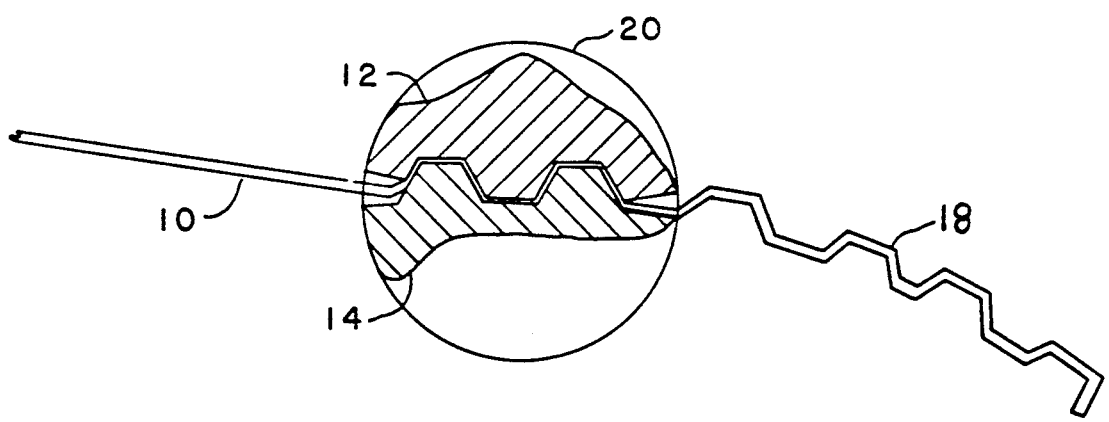
FIG. 2 is an enlarged view of the active forming region of FIG. 1.
Figure 3A:
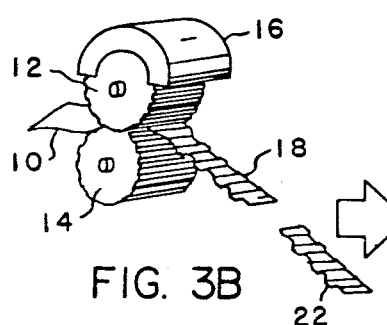
Figure 3B:
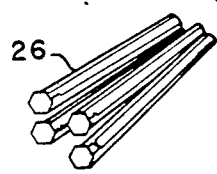
Figure 3C:
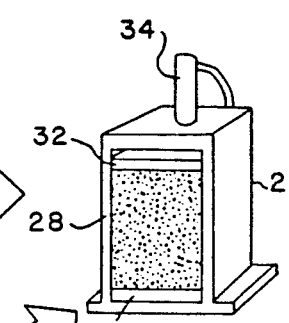
Figure 3D:
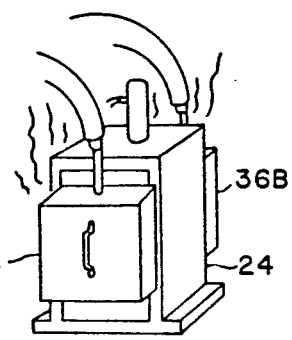
Figure 3E:
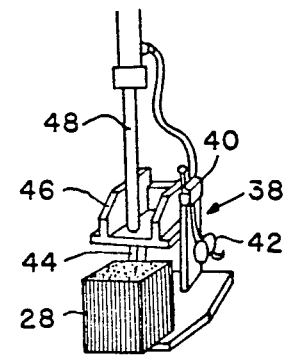

The forming region 20 of FIG. 2 is enlarged in FIG. 3, showing the half hexagon teeth of upper roller 12 and lower roller 14 meshing together to form the flat material 10 into corrugated material 18 having a half hex pattern.

The pictorial diagram of FIG. 3 illustrates the basic process steps of the overall method of this invention for manufacturing a block of honeycomb core material from thermoplastic fiber ribbon.

At step A, a flat ribbon 10 of thermoplastic fiber is corrugated between forming rollers 12 and 14 (as described in connection with FIGS. 1 and 2). The resulting corrugated ribbon 18 is then cut at step B into sheets of desired length, such as sheet 22 shown.

At step C, the sheets are stacked in a press 24. A hexagonal mandrel 26 is placed into each groove of the corrugations upon each sheet added to the stack, Mandrels 26 are typically made of metal such as aluminum and treated with a release agent to prevent sticking. The stack 28 is built up on a lower press platen 30 and, when full, pressed together by an upper platen 32, urged downwardly by a hydraulic cylinder 34.

The mandrel may be made of other thermal conductive metal or materials such as copper, or even steel, provided that the thermal conductivity is at least as large as that of the associated parts, i.e., the mold, the tools, and the hydraulic system that operates the same.

Figure 4:
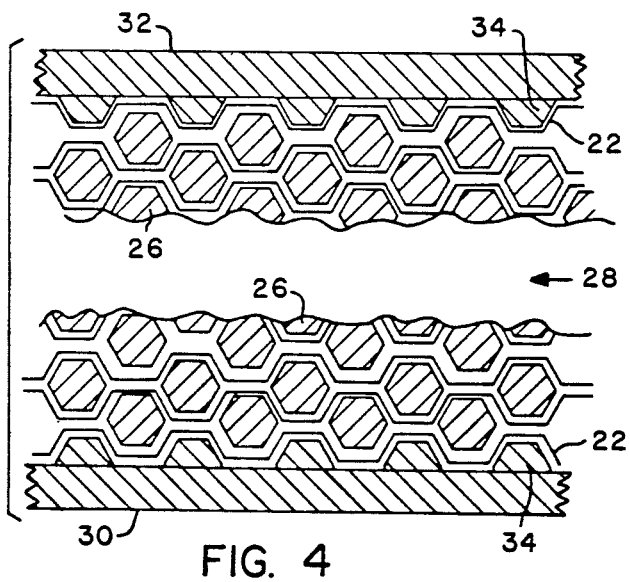
FIG. 4 is an enlarged side view of a portion of a stack of half hexagon formed sheets and hexagon mandrels, as loaded in the press at step C in FIG. 3 in preparation for bonding.
Figure 3F:
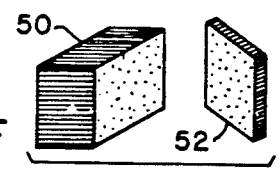

As shown in the enlarged end view of FIG. 4, the pressurized stack 28 forms a honeycomb pattern of rows of hex mandrels 26 interleaved between the corrugated sheets 22. Conformal support for the lower and upper sheets of the stack 28 is provided by half hex spacers 34 at the lower platen 30 and the upper platen 32.

Referring again to FIG. 3, at step D heat is applied by forced air heating assemblies 36A and 36B, secured to both sides of the press 24, to bring the stacked sheets up to a softening temperature to fusion bond the interfacial facets of adjacent sheets and accurately form hex ducts around the mandrels. After the heating cycle is terminated, pressure is maintained on the stack until it cools and sets; then it is removed from the bonding press 24.

Upon cooling, at step E the mandrels are removed individually from the bonded stack 28 using a special pneumatic long stroke mandrel extractor press 38 having a manually operated pressure control valve 40 and a flow steady pressure exerted by pin 44.

At step F, with the mandrels removed, the block 50 of bonded honeycomb core material may be machined or sawn into slices of desired thickness such as slice 52 shown, as finished core material ready to be incorporated into composite structure.

Particular parameters of the process depend on the type of material used, the honeycomb pattern size and the size of block to be produced; as an example, in FIG. 1, for a cubic block of core material having finished dimensions of about 6" (15.2 cm) on each side, rollers 12 and 14 are made 6.114" (15.53 cm) outside diameter and about 8" (20.3 cm) wide to form 6" (15.2 cm) wide material. For a hexagon duct width of 3/16" (0.1875", 4.76 mm) the roller tooth configuration in FIG. 2 is made 0.109" (2.769 mm) at the plateau and 0.120" (3.048 mm) at the valley floor at a depth of 0.094" (2.388 mm), for PAS-2 material having a typical thickness of 0.01" (0.254 mm). Cooling and setting of corrugated material 18 may be expedited by directing cool air from a row of jets onto its surface as it exits the roller interface.

The core bonding press 24 in FIG. 3 is designed to exert up to 200 psi across the total sheet area of the core block. The press structure is constructed of machined and ground steel plates. The vertical sides are spaced to allow an even multiple of the width of 19 cells which equals 6.384" (16.22 cm). The aluminum press platens 30 and 32 close in a range to compress a 6" (15.2 cm) high stack of ribbons and hexagon mandrels. The press platens 30 and 32 are machined to provide the half hex spacers 34 in FIG. 4; alternatively separate half hex spacers 34 could be laid in individually, optionally fastened to flat platen surfaces. Platens 30 and 32 are insulated from the rest of the press structure by Martensite sheets, on which they are mounted, to protect the hydraulic cylinders and oil from the high temperatures required to consolidate the core block. Pressure between the platens is provided from one or more cylinders 34 in a simple hydraulic system which may utilize a pressure gauge, a hand pump and a shut-off valve.

Regarding heat for core consolidation, since the thermoplastic does not actually cure it does not need to remain at the bonding temperature for any length of time. Furthermore, it is advantageous to heat up and cool off the assembly as rapidly as possible to prevent transfer of excessive amounts of heat to the hydraulic system. For these reasons a Moen type heater was selected as the heat source in units 36A and 36B: heat is rapidly transferred to the stack 28 by impinging air superheated air at very high velocities onto the ends of the aluminum mandrels 26 by air jets in distribution panels inside heating units 36A and 36B.

Extraction of the aluminum mandrels from the core ducts after fusion bonding as in FIG. 3, step E, can be difficult and tedious. Of particular difficulty is removing "stuck" mandrels without damaging the duct walls. The aluminum mandrels soften back to near "0" condition during the high temperature fusion bonding, so too much pressure from pushing or pounding will spall or "mushroom" the ends, and potentially damage the duct wall as it passes through. The special pneumatic press 38 developed in conjunction with the processes of present invention is provided with a special drive pin 44 which is 0.125" (3.175 mm) in diameter and has a travel of over 6" (15.24 cm). Pin 44 is supported by fixed and floating bushings to prevent buckling under pressure, enabling the mandrels to be pressed out with a steady, even, controlled downward pressure.

The above described method and apparatus of a particular illustrative embodiment discloses the best mode known for practicing the invention to produce core material in cubes in the order of 6" (15.2 cm) per side. The modification of certain parameters such as physical dimensions, press force, temperatures and timing of the processes taught by this invention, in order to optimally accomodate different sized work pieces and/or alternative equivalent materials are within the regular scope and competence of those skilled in the arts of plastic processing.

In a particular experimental embodiment the thermoplastic material used was polyethersulfone foam impregnated woven glass cloth, and the corrugated sheets were interleaved with alternate rows of aluminum mandrels and rubber mandrels. The aluminum mandrels served to conduct heat while the rubber mandrels served to distribute pressure throughout the stack. In a preferred form of the invention, all aluminum mandrels can be used which makes it possible to process the thermoplastic materials at high temperatures which would otherwise be detrimental to rubber. While aluminum has been disclosed as suitable, other high thermal conductive material may be substituted, such as copper.

The particular hex duct honeycomb pattern shown herein should not be considered as restrictive: the processes of this invention are generally applicable to ducted cores of various matrix patterns of which the honeycomb is representative.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A method for forming a fiber reinforced honeycomb structure of open cells from a ribbon of thermoplastic resin impregnated fibercloth, said resin having a softening temperature, comprising:

providing a pair of forming wheels mounted for rotation to lie in the same plane with their outer perimeters touching at a tangent, each wheel having teeth of mating shape and corrugated for meshing together;

heating one of the wheels to above the softening temperature of said thermoplastic resin while maintaining the other wheel at a temperature substantially below said softening temperature;

training said ribbon between said wheels in full contact with said other wheel around a substantial arc thereon so that said ribbon makes contact with said heated wheel solely at the region of mesh between said wheels whereat it is softened and shaped by the contact forces between the wheels into a corrugated form and is thereafter immediately cooled by contact with said other wheel as it continues to travel along said arc in contact with said other wheel to form a shaped ribbon;

cutting the shaped ribbon into sheets;

stacking a plurality of shaped mandrels along with a plurality of said sheets configured in a manner to uniformly surround and separate each of said mandrels and to form a stack having a systematic matrix pattern of said corrugations;

applying pressure to said entire stack, thereafter applying heat to said stack so as to thermal fusion bond the thermoplastic material together into a ducted pattern conforming to said corrugated shape and maintained by said mandrels;

thereafter cooling said stack and removing the pressure therefrom; and thereafter extracting said mandrels from said stack to leave a ducted core structured in said systematic matrix pattern.

2. The method according to claim 1 wherein said corrugations are formed to be half-hexagon corrugations, said mandrels are hexagonal in cross section, and said corrugations and said mandrels are correspondingly sized such that, when said sheets are stacked together with said mandrels, adjacent pairs of said sheets are caused to abut at corresponding interfacial facets of said corrugations so as to form said core in a honeycomb pattern.

3. A method of producing a honeycomb core as in claim 1 in which said fibercloth is a plurality of sheets of polyethersulfone foam impregnated woven glass cloth;

in which said stacking step includes interleaving said sheets with alternate rows of aluminum mandrels and rubber mandrels to form a honeycomb core assembly;

and in which said applying heat and pressure step includes applying said heat and pressure to said assembly within a temperature range from about 400 degrees F. to about 550 degrees F. to bond said polyethersulfone foam impregnated woven glass cloth half hex sheets together to form an integral structure.

* * * * *